United States Patent [19]
Hatcher

[11] 4,145,989
[45] Mar. 27, 1979

[54] OSCILLATING SIGNAL FOR BICYCLES

[76] Inventor: Merrel E. Hatcher, 1106 Abbot, Richland, Wash. 99352

[21] Appl. No.: 897,662

[22] Filed: Apr. 19, 1978

[51] Int. Cl.² .................................... B60Q 1/30
[52] U.S. Cl. .......................... 116/56; 350/99; 116/303
[58] Field of Search .............. 116/52, 53, 56, 61, 116/115; 74/13, 194; 350/99; 340/134

[56] References Cited

U.S. PATENT DOCUMENTS

| | | | |
|---|---|---|---|
| 3,099,243 | 7/1963 | Schwartz | 116/56 |
| 3,478,713 | 11/1969 | Brames | 116/56 |
| 3,528,721 | 9/1970 | La Londe | 350/99 |
| 3,802,085 | 4/1974 | Schoonmaker | 116/115 |
| 3,887,900 | 6/1975 | Goedert | 116/56 |
| 3,982,771 | 9/1976 | Tropeano | 116/35 R |
| 4,038,935 | 8/1977 | Margiloff | 116/35 R |
| 4,046,098 | 9/1977 | Mancinelli | 116/56 |

Primary Examiner—S. Clement Swisher
Assistant Examiner—Denis E. Corr
Attorney, Agent, or Firm—Clarence A. O'Brien; Harvey B. Jacobson

[57] ABSTRACT

Support structure is provided for mounting on a bicycle fender adjacent a peripheral portion of an associated wheel of the bicycle. A signal member is mounted on the support structure for oscillation relative thereto and a rotary member is supported from the support structure for engagement with and to be frictionally driven by the bicycle wheel. Motion converting structure is operatively connected between the rotary member and the oscillatable signal member for oscillating the latter in response to rotation of the rotary member as frictionally driven by the wheel of the bicycle.

10 Claims, 6 Drawing Figures

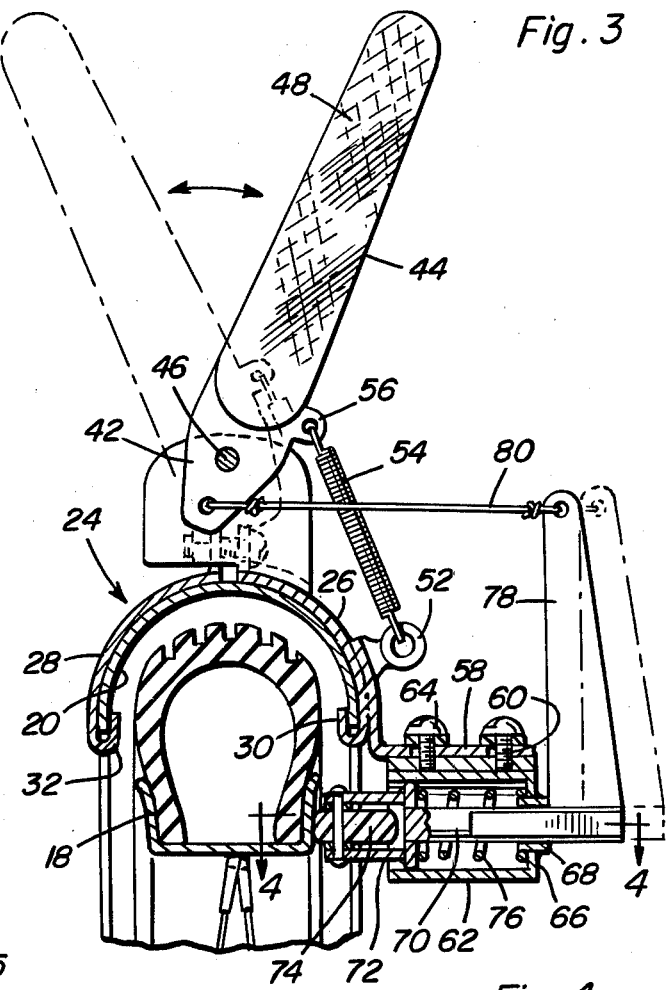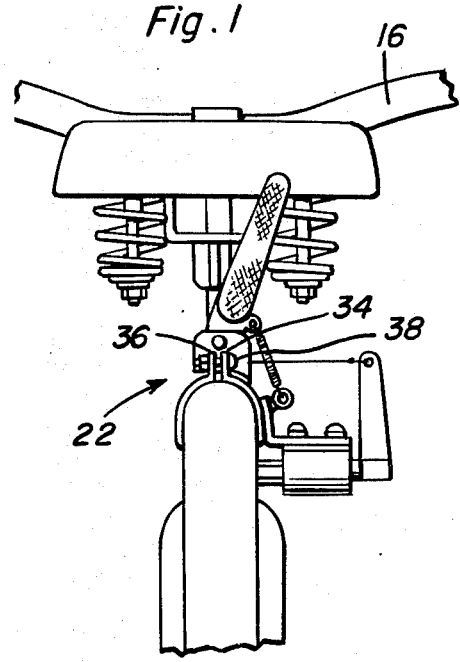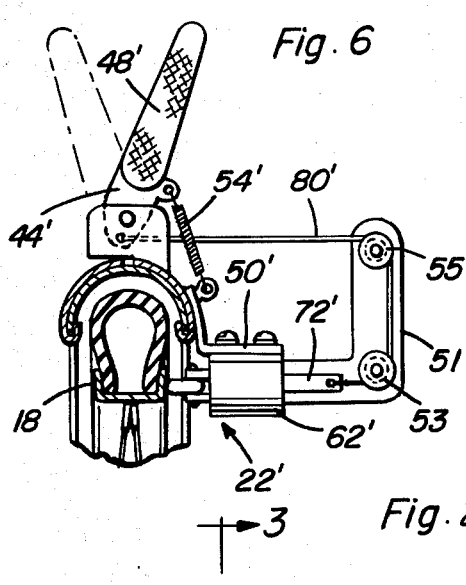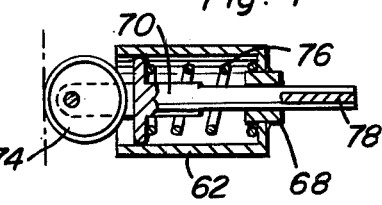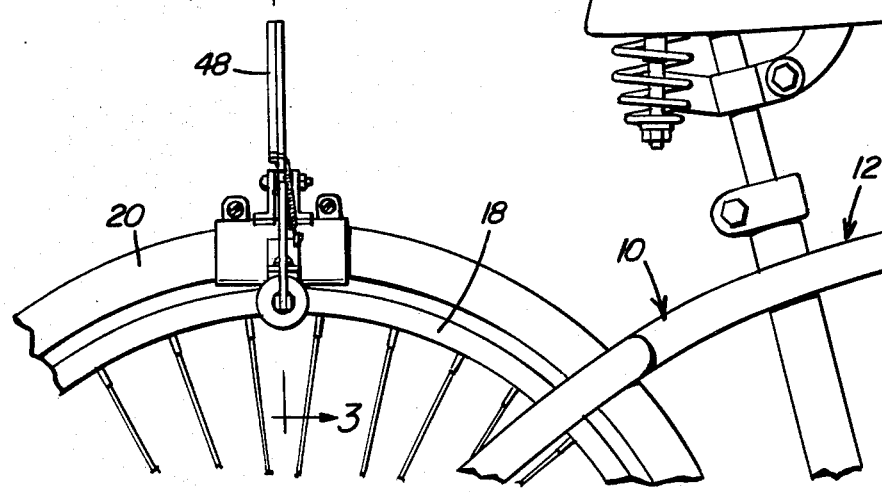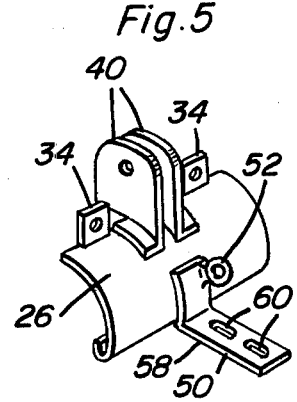

OSCILLATING SIGNAL FOR BICYCLES

BACKGROUND OF THE INVENTION

There are many forms of signals which have been heretofore provided on bicycles and such signals are usually constructed in a manner so as to render the bicycle or a person riding the bicycle more visible. Particularly, many different forms of signals have been provided for use on bicycles at night and many of these night time signals are of the light reflective type whereby a portion of the light rays of the headlights of an oncoming vehicle may be reflected back toward the driver of the vehicle in order to identify the presence of the bicycle upon which the signal is mounted. Various forms of light reflective signals have been utilized. Some signals are stationarily mounted on the associated bicycle and other light reflective signals are movably mounted on the associated bicycle in one way or another. Of course, the movable light reflective signal members are more desirable in that they are capable of reflecting light incident thereon from different directions.

While some types of movable signal members are driven by the drive sprocket of a bicycle and other movable warning signals are driven from a portion of a rotary wheel of the associated bicycle, those movable signal members which are driven by an associated wheel of the bicycle are generally thought to be more desirable inasmuch as drive sprocket driven rotary signal members can interfere with normal propulsion of the associated bicycle through the drive sprocket thereof.

Examples of various forms of bicycle mounted signal members including rotary signal members driven from wheel portions of the associated bicycle are disclosed in U.S. Pat. Nos. 3,099,243, 3,478,713, 3,982,771, 4,038,935 and 4,046,098.

BRIEF DESCRIPTION OF THE INVENTION

The signal of the instant invention includes an oscillatable signal member swingably supported from support structure mounted on a fender portion of the associated bicycle. The support structure further reciprocally supports a mount and the mount has a rotary wheel eccentrically journalled therefrom and disposed for rolling engagement with a peripheral portion of the associated bicycle wheel, the reciprocal mount being spring-biased in a direction to cause the rotary member to be disposed in friction rolling engagement with the bicycle wheel periphery. Further, connecting structure is provided between the reciprocal mount and the oscillatable signal member for oscillating the latter in response to reciprocation of the mount.

The main object of this invention is to provide a readily viewable oscillatable signal for use on a bicycle and an oscillatable signal which is drivingly oscillated in response to rotation of one of the wheels of the bicycle.

Another object of this invention is to provide a light reflective oscillatable signal member whereby the signal member will also be effective to signal the presence of the associated bicycle when the headlights of an oncoming vehicle strike the signal member.

Still another object of this invention is to provide a safety signal for a bicycle which may be readily mounted on existing fender equipped bicycles.

A further object of this invention is to provide a safety signal for bicycles which will be readily usuable on bicycles having different size wheels.

A final object of this invention to be specifically enumerated herein is to provide a bicycle safety signal in accordance with the preceding objects and which will conform to conventional forms of manufacture, be of simple construction and easy to install so as to provide a device that will be economically feasible, long lasting and relatively trouble free in installation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary rear elevational view of a conventional form of bicycle with a first form of oscillating signal of the instant invention operatively mounted on the rear fender of the bicycle;

FIG. 2 is a fragmentary side elevational view of the assemblage illustrated in FIG. 1 and as seen from the right side thereof;

FIG. 3 is an enlarged fragmentary vertical transverse sectional view taken substantially upon the plane indicated by the section line 3—3 of FIG. 2;

FIG. 4 is a fragmentary horizontal sectional view taken substantially upon the plane indicated by the section line 4—4 of FIG. 3;

FIG. 5 is a perspective view of one half of the mounting clamp for the signal illustrated in FIGS. 1 through 4; and FIG. 6 is a fragmentary transverse vertical sectional view similar to FIG. 3 but on a reduced scale and illustrating a slightly modified form of oscillating signal.

DETAILED DESCRIPTION OF THE INVENTION

Referring now more specifically to the drawings the numeral 10 generally designates a conventional form of bicycle including a main frame referred to in general by the reference numeral 12 provided with a rider's seat 14, a handlebar 16, a rear wheel 18 journalled from the rear of the frame 12 and a rear fender 20 partially embracing and extending about the rear wheel 18, the fender 20 being supported from the frame 12. Of course, the bicycle 10 further includes a front wheel (not shown) and the other usual components of a bicycle.

A first form of oscillating signal constructed in accordance with the present invention is referred to in general by the reference numeral 22 and is illustrated in FIGS. 1 through 5 of the drawings. The signal 10 includes support means in the form of a clamp assembly referred to in general by the reference numeral 24. The clamp assembly 24 includes a pair of quarter cylindrical clamp sections 26 and 28 including corresponding inwardly and backturned ends 30 and 32 on one pair of corresponding arc ends thereof and pairs of registered apertured mounting ears 34 and 36 on the other pair of arc ends thereof. Fasteners 38 are secured through the registered ears 34 and 36 with the ends 30 and 32 engaged beneath the opposite side marginal portions of the upper portion of the fender 20 and the sections 26 and 28 extending upwardly over the upper surfaces of the fender 20. In this manner, the clamp assembly 24 is removably clampingly supported from the fender 20.

The section 26 additionally includes a pair of upstanding apertured mounting ears 40 between which the lower end portion 42 of an upstanding finger-like signal member 44 is oscillatably supported by means of a pivot fastener 46 secured through the signal member 44 and the apertured mounting ears 40. The rear surface of the signal member 44 has a shape conforming reflector 48 mounted thereon.

The section 26 additionally includes a support bracket 50 including an eye 52 and a light expansion spring 54 is connected between the eye 52 and a similar eye 56 carried by the signal member 44 above the pivot fastener 46. Also, the bracket 50 includes a horizontally outwardly projecting arm portion 58 including elongated longitudinally extending and spaced slots 60 formed therein and a support and guide sleeve 62 is adjustably supported from the arm portion 58 by means of suitable fasteners 64 secured through and shiftable along the slots 60. The support and guide sleeve 62 generally parallels the axis of rotation of the wheel 18 and is disposed outwardly of the right side of the wheel 18 with its left hand end closely opposing the upper periphery of the wheel 18. The right hand end of the sleeve 62 is closed by means of an end wall 66 having a guide sleeve 68 secured therethrough and a plunger assembly 70 extends through and is reciprocally received within the sleeve 62. One end of the plunger assembly 70 is flattened on its opposite sides and is snugly slidably received through the sleeve 68 and the other end of the plunger assembly 70 includes a bifurcated end portion 72 from which a friction wheel 74 is eccentrically journalled. A compression spring 76 is disposed within the sleeve 62 between the inner side of the end wall 66 and the bifurcated end portion 72 and therefore yieldingly biases the plunger assembly 70 to the left as viewed in FIG. 3 of the drawings with the friction wheel 74 frictionally engaged with the upper periphery of the wheel 18.

The end portion of the plunger assembly 70 projecting endwise outwardly from the sleeve 68 includes an upstanding arm 78 and the upper end of the arm 78 is horizontally registered with the lower terminal end of the signal member 44 below the pivot fastener 46. An elongated flexible tension member 80 extends and is directly connected between the upper end of the arm 78 and the lower end portion of the signal member 44 below the pivot fastener 46. Accordingly, upon rotation of the wheel 18 the friction wheel 74 will be rotated and the plunger assembly 70 will be reciprocated back and forth between the phantom and solid positions thereof illustrated in FIG. 3. By the connection of the arm 78 with the signal member 44 through the tension member 80, as the plunger assembly 70 is reciprocated back and forth during rotation of the wheel 18 the signal member 44 will be oscillated between the phantom and solid positions thereof illustrated in FIG. 3.

With attention now invited more specifically to FIG. 6 of the drawings, a second form of safety signal is referred to in general by the reference numeral 22'. The safety signal 22' is substantially identical, in practically all respects, to the safety signal 22 and therefore has the various components thereof designated by prime reference numerals corresponding to the numerals designating similar components of the safety signal 22. The signal 22' differs from the signal 22 in that the plunger assembly 72' is not equipped with an arm corresponding to the arm 78. Rather, the bracket 50' supports a stationary arm 51 therefrom including a plurality of guide pulleys 53 and 55 supported therefrom. The plunger 72' is connected to the signal member 44' by means of an elongated flexible tension member 80' corresponding to, but longer than, the tension member 80 and the tension member 80' has one end thereof connected to the outer end of the plunger assembly 72', longitudinally spaced mid-portions thereof passed about the pulleys 53 and 55 and the other end thereof connected to the lower end of the signal member 44'. Otherwise, the signal 22' is identical to the signal 22. Accordingly, it may be understood that operation of the signal 22' is the same as the operation of the signal 22 inasmuch as rotation of the wheel 18' is effective to cause reciprocation of the plunger assembly 72' and such reciprocation is effective to cause oscillation of the signal member 44'.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A safety signal for wheeled vehicles including at least one support wheel, support means for mounting on said vehicle adjacent said wheel, a signal member mounted on said support means for oscillation, only, relative thereto, a rotary member rotatably supported from said support means for engagement with and to be therefore driven by said wheel and relative to which rotary member said signal member is oscillatable, and motion converting means operatively connecting said rotary member and said signal member for oscillating the signal member in response to rotation of the rotary member as driven by said wheel, said motion converting means including a mount supported from said support means for oscillatory rectilinear movement relative thereto, said rotary member being eccentrically journalled from said mount for effecting oscillatory movement of said mount in response to rolling frictional contact of said rotary member with said wheel, said motion converting means also including connecting means contiguously connected between said signal member and both said support means and said mount for oscillating the signal member in response to oscillatory movement of the mount.

2. The combination of claim 1 wherein said connecting means includes an elongated flexible tension member directly connected to and extending between said mount and signal member.

3. The combination of claim 2 wherein said connecting means further includes spring means operatively connected between said signal member and said support means yieldingly opposing movement of said signal member during tensioning movement of said tension member by said mount.

4. The combination of claim 1 wherein said connecting means includes an elongated flexible tension member connected to and extending between said mount and signal member, said support means including guide means supported therefrom laterally deflecting at least one mid-portion of said tension member and with which said tension member is guidingly engaged.

5. The combination of claim 4 wherein said connecting means further includes spring means operatively connected between said signal member and said support means yieldingly opposing movement of said signal member during tensioning movement of said tension member by said mount.

6. The combination of claim 1 wherein said support means includes a clamp assembly for embracingly and releasably clampingly engaging the rear fender of a bicycle.

7. In combination with a vehicle including at least one ground engageable support wheel, a safety signal, support means mounted on said bicycle adjacent said wheel, a signal member mounted on said support means for oscillation, only, relative thereto, a rotary member rotatably supported from said support means rollingly engaged with one side wall of and to be therefore driven by said wheel and relative to which rotary member said signal member is oscillatable, and motion converting means operatively connecting said rotary member and said signal member for oscillating the signal member in response to rotation of the rotary member as driven by said wheel, said motion converting means including a mount supported from said support means for oscillatory rectilinear movement relative thereto, said rotary member being eccentrically journalled from said mount for effecting oscillatory movement of said mount in response to rolling frictional contact of said rotary member with said wheel, said motion converting means also including connecting means contiguously connected between said signal member and both said support means and said mount for oscillating the signal member in response to oscillatory movement of the mount.

8. The combination of claim 7 wherein said connecting means includes an elongated flexible tension member directly connected to and extending between said mount and signal member.

9. The combination of claim 7 wherein said connecting means includes an elongated flexible tension member connected to and extending between said mount and signal member, said support means including guide means supported therefrom laterally deflecting at least one mid-portion of said tension member and with which said tension member is guidingly engaged.

10. The combination of claim 7 wherein said bicycle includes a fender partially embracing and extending about said wheel, said support means including a clamp assembly embracingly and releasably clampingly engaged with said fender.

* * * * *